US007492913B2

(12) United States Patent
Connor et al.

(10) Patent No.: US 7,492,913 B2

(45) Date of Patent: Feb. 17, 2009

(54) LOCATION AWARE DIRECTED AUDIO

(75) Inventors: Patrick L. Connor, Portland, OR (US); Douglas D. Boom, Portland, OR (US); Scott P. Dubal, Hillsboro, OR (US); Mark V. Montecalvo, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 509 days.

(21) Appl. No.: 10/739,503

(22) Filed: Dec. 16, 2003

(65) Prior Publication Data

US 2005/0129254 A1 Jun. 16, 2005

(51) Int. Cl.
*H04B 3/00* (2006.01)

(52) U.S. Cl. .......................................... 381/77; 381/82

(58) Field of Classification Search ............. 381/77-78, 381/82, 310, 80, 73.1; 600/595
See application file for complete search history.

(56) References Cited

U.S. PATENT DOCUMENTS

| | | | | |
|---|---|---|---|---|
| 5,131,050 | A * | 7/1992 | Naslund | 381/82 |
| 6,176,837 | B1 * | 1/2001 | Foxlin | 600/595 |
| 6,409,687 | B1 * | 6/2002 | Foxlin | 600/595 |
| 6,990,211 | B2 * | 1/2006 | Parker | 381/310 |
| 7,130,430 | B2 * | 10/2006 | Milsap | 381/77 |
| 7,379,552 | B2 * | 5/2008 | Neervoort et al. | 381/58 |
| 2003/0045816 | A1 * | 3/2003 | Foxlin | 600/595 |
| 2004/0101146 | A1 * | 5/2004 | Laitinen et al. | 381/77 |

* cited by examiner

*Primary Examiner*—Vivian Chin
*Assistant Examiner*—Disler Paul
(74) *Attorney, Agent, or Firm*—Blakely, Sokoloff, Taylor & Zafman LLP

(57) ABSTRACT

A directed audio system, a network interface communicatively coupled with a network, and a controller to receive, via the network interface, an estimate for a location from a locating device communicatively coupled with the network, and to cause the directed audio system to direct an audio signal based at least in part on an estimate for the location received from the locating device.

13 Claims, 3 Drawing Sheets

LOCATION AWARE DIRECTED AUDIO

BACKGROUND

Directed audio systems allow a user to be located at nearly any point within an area and to listen to selected audio content while preventing others in the same area from hearing much or any of the audio content, without the aid of attachments such as headphones or any similar speaker based devices attached to the person or clothing of the user. A simple version of such a technology might be an array of speakers in a ceiling such that only one or more selected speakers located over the listener's location plays the audio content while all other speakers are silent, or alternatively play other audio content for other listeners. Another example of such technology is HyperSonic Sound (HSS)[1], a technology used in products marketed by American Technology Corporation. HSS products convert an audio signal into a complex ultrasonic signal that is radiated from a transducer emitter. The signal may be tightly focused because it is highly directional. A listener in the path of the beam of ultrasonic energy is able to hear the audio signal while others outside the beam are unable to hear the signal or may hear it at a low level. The audible frequencies associated with the audio signal are created by interactions between different frequencies carried in the ultrasonic beam and air molecules which respond non-linearly to the ultrasonic frequencies.

[1]The product names used are for identification purposes only. All trademarks and registered trademarks are the property of their respective owners.

A related system is described in Austin Lowrey III, Apparatus and method of broadcasting audible sound using ultrasonic sound as a carrier, U.S. Pat. No. 6,052,336. Another system with similar goals is described in Wayne B Brunkan, Hearing system, U.S. Pat. No. 4,877,027.

Networks allowing the transmission of data are well known. Networks that are associated with mobile devices are well known, and examples are abundant. For example, a cellular telephone system is a network that allows mobile users to transmit and receive data, including, for example, digitized voice transmissions, text messages and other data. Other forms of wireless networking allow processor based devices of various type to intercommunicate with each other and with other networks, including for one example a wireless network that complies with the 802.11 family of standards. See for example, ISO/IEC 8802-11:1999(E) ANSI/IEEE Std 802.11. *Part* 11*: Wireless LAN Medium Access Control* (MAC) and Physical Layer (PHY) specifications, 1 edition, 1999.

Some mobile device networks are persistent, that is, a node stays in a network as long as it is in the vicinity of a network access point and is operating; others may be spontaneous and short lived. For one instance a device may form a spontaneous, temporary network with another device when two devices are proximal and then disconnect when either device moves away, only to form another spontaneous network.

Locating devices are also well known. A common example of a locating device is a GPS receiver; because of the common knowledge of GPS receivers, this type of locating device is not further described here, except to note that GPS receivers work better outdoors, in general, than indoors.

Other forms of locating devices that work indoors or within a bounded area are also well known. Several classes of locating devices based on a radio source at the device or a radio-responsive circuit at the device are known. For one example, a cellular phone may be locatable based on the signal emitted by the cellular phone and its reception by locators. A wireless device such an 802.11 class transceiver on a wireless network may be similarly located. Even an un-powered device that has a Radio-Frequency Identification (RFID) circuit as a component may be locatable by other devices able to activate and read a signal from the activated RFID circuit.

DETAILED DESCRIPTION

Figure 1:
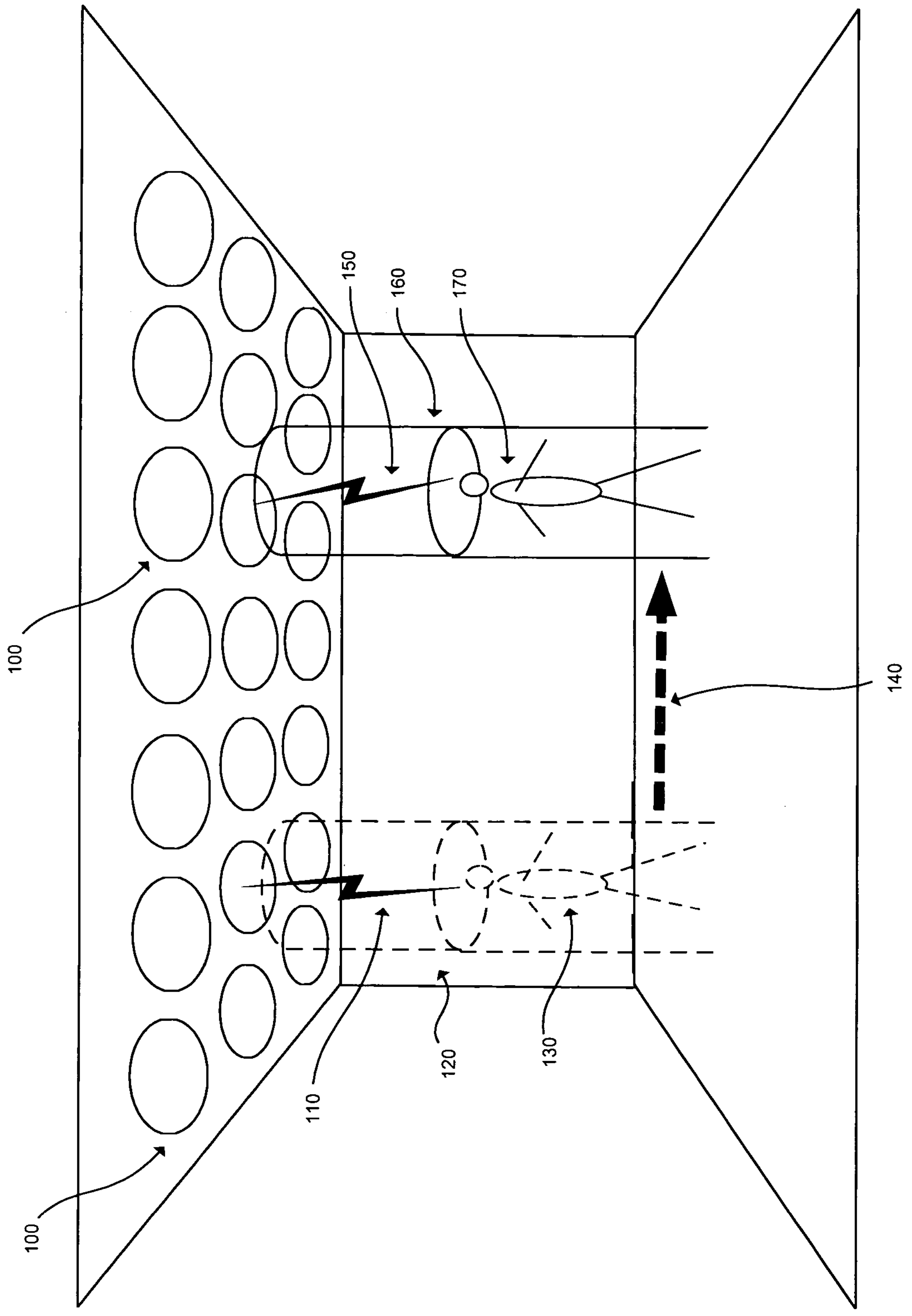
FIG. 1 Depicts one embodiment showing a user moving through a directed audio system made up of a location aware vertical speaker array.

In one embodiment depicted in FIG. 1, a target, which is generally but not always a human user (and will be referred to hereinafter as a "user" without loss of generality) moves across a space from a location 130 to another 170 along a path 140. As the user moves, a network connection that connects the user to an audio system at both the first location and the second is maintained at 110 and 150 between one or more network access points in the ceiling and the user, keeping the user communicatively coupled to the system as he or she moves. The detection of the user's location by a location aware system then causes one or more of an array of audio sources 100 to activate in the vertical proximity of the user, producing an audio signal or content audible to the user in a vertical zone that moves with the user 120 and 160, but that remains generally inaudible or only audible at a low level to others at locations different from the user's location. In one implementation of the embodiment depicted in the figure, the network connection might be formed by a network interface such as a 802.11 class transceiver also on the user's person incorporated into a device such as a personal digital assistant or notebook computer, communicating with one or more access points to an 802.11 network built into the ceiling. Using a locating device such as an RFID tag embedded in the user's clothing or in an item worn by the user such as a bracelet, necklace, or identification badge, an RFID detection system built into the ceiling, and the 802.11 network, the audio system controller determines the likely location of the user in the space and activates only those speakers directly over that location.

Many variations of this embodiment are possible. In one variation, the communication between the directed audio system and the user's devices shown at 110 and 150 may take place over separate spontaneously formed and disconnected networks that appear and disappear as the user moves into the proximity of a network device in the ceiling. In some embodiments, the location of the user in the space may be detected by other means such as by interruption of an infrared beam or by pressure sensors in the floor. In other embodiments, the location of the user in space may be achieved by triangulation of radio signals emitted by one or more of the user's communication devices. In some embodiments, portions of the network may be wired, for example, the location system may be wired to the directed audio system by a wired network such as an Ethernet or another type of communication network.

Figure 2:
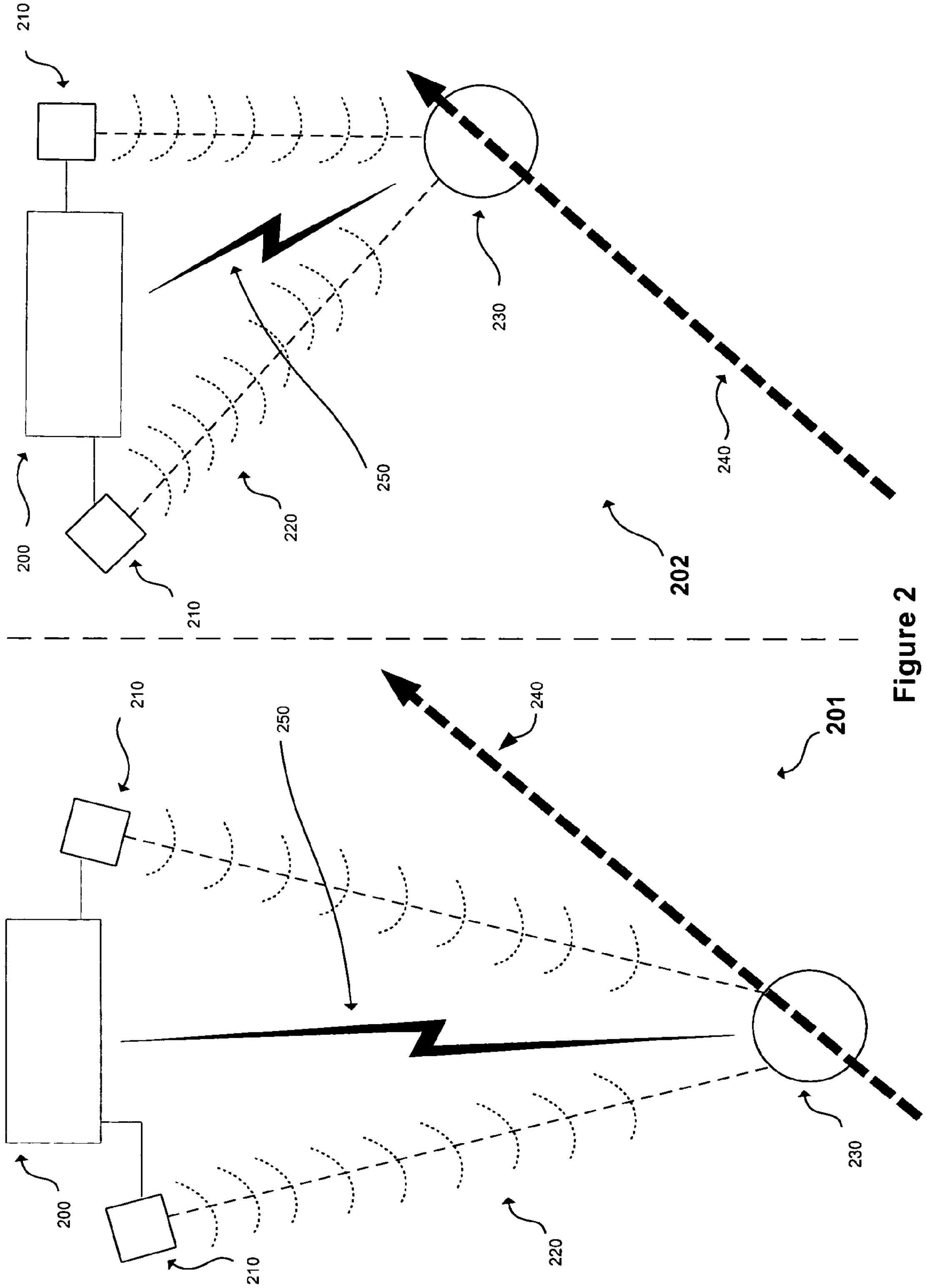
FIG. 2 Depicts one embodiment showing a user being followed by a location aware beaming directed audio system.

FIG. 2 depicts a plan view of another embodiment using a system of directed ultrasonic beams carrying audible content to direct audio. In the figure, a user 230 moves from a position shown in a time snapshot 201 to another position shown in time snapshot 202 along path 240. As the user moves through the area along his or her path of travel, a network connection 250 allows the user's devices to communicate with a controller 200. As in the embodiment discussed earlier, the network may be one of various types of network, including an 802.11 family network, or a cellular telephony network, or a spontaneously formed network. Data transmitted to the controller over the network includes a location estimate for the user, which may be obtained in one of the ways discussed earlier, among others, including for example by use of a GPS receiver, if the setting for the user is outdoors. In other embodiments, such as those implemented indoors, the location estimate may be obtained using an RFID tag, or another appropriate locating technology. The controller then uses the location information to change the direction of one or more ultrasonic beams encoded with audio content in accordance with the HSS technology described above with sources 210 as shown by the changing angle of the beams in the two snapshots 201 and 202. In the depicted embodiment, the user receives stereophonic or binaural information using two beams. Ultrasonic audio transmission technology may be capable of precise aiming to a specific ear and creating a stereo image as shown in the figure. In other embodiments, one beam may suffice for mono applications. As discussed earlier, listeners outside the direct path of the beamed audio will generally hear the content at a substantially lower level than the target user.

In embodiments such as those described above and in other embodiments, a variety of mechanisms for the storage, selection and modification of the level and other sonic characteristics of the audio content that is provided to a user by the directed audio system may be used. For one instance, audio content may be provided from a server on a network, including from a server on the Internet. In another, the content may be provided by a prerecorded medium such as a disc or tape. Selection of the content that is provided may similarly depend on one or more of several factors. The user may have predetermined the content by selecting it using a network accessible device such as a PDA or cell phone. Alternatively, the system may be keyed to a specific identifying characteristic of the user such as a biometric characteristic (such as iris, face or voice recognition) or a unique RFID, detectable by the system on the user's arrival within the space in which the directed audio is provided. The system may also direct different audio content to different locations in a space if and when the user moves into those locations. It may, in some embodiments, change the level of the content depending on the location of the user. Other variations may involve the system tracking the locations of multiple users in a space and muting or lowering the level of the audio content if two or more users approach each other within a conversational distance.

As noted earlier embodiments are not restricted to a human user as a target for a locating device based directed audio system. For example, a microphone on a movable platform or vehicle may also be a target for a directed audio system, for example when calibrating or maintaining the system. Generally, any object within the range of a directed audio system that may be moved and has a locating device attached to it may be the target for an embodiment.

Figure 3:
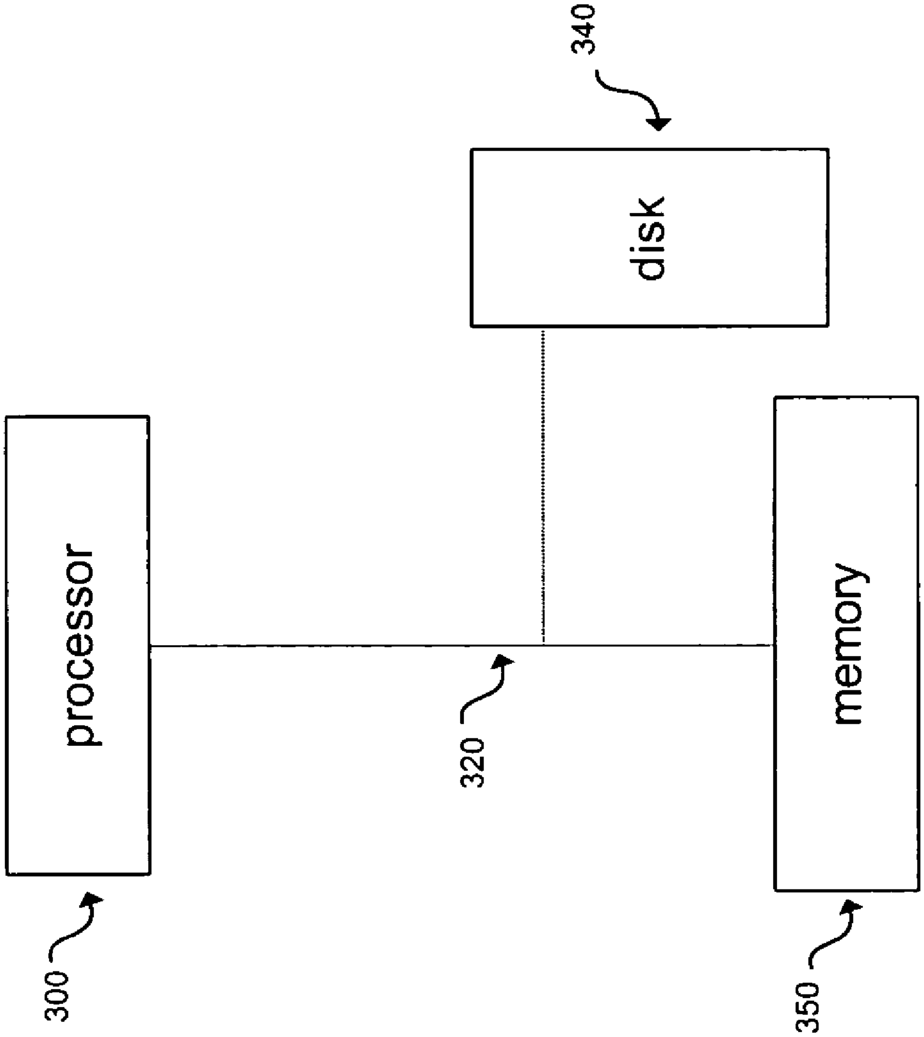
FIG. 3 Depicts a processor based system.

In general, an embodiment may be implemented at least in part by a processor based system such as that depicted in FIG. 3. Such a system is a processor based system including a processor 300, a memory 350 to store data and programs executable by the processor, and a storage unit such as a disk system 340 all interconnected by a bus system 320. A program embodying the various computations described may be stored on the disk system and loaded into memory via the bus system and executed by the processor on layout data which may also be stored on the disk system and optionally in memory.

While certain exemplary embodiments have been described above and shown in the accompanying drawings, it is to be understood that such embodiments are merely illustrative of and not restrictive on the broad aspects of various embodiments of the invention, and that these embodiments not be limited to the specific constructions and arrangements shown and described, since various other modifications are possible. It is possible to implement the embodiments or some of their features in hardware, programmable devices, firmware, software or a combination thereof.

Embodiments may be provided as a computer program product that may include a machine-readable medium having stored thereon data which when accessed by a machine may cause the machine to perform a process according to the claimed subject matter. The machine-readable medium may include, but is not limited to, floppy diskettes, optical disks, DVD-ROM disks, DVD-RAM disks, DVD-RW disks, DVD+RW disks, CD-R disks, CD-RW disks, CD-ROM disks, and magneto-optical disks, ROMs, RAMs, EPROMs, EEPROMs, magnet or optical cards, flash memory, or other type of media/machine-readable medium suitable for storing electronic instructions. Moreover, embodiments may also be downloaded as a computer program product, wherein the program may be transferred from a remote computer to a requesting computer by way of data signals embodied in a carrier wave or other propagation medium via a communication link (e.g., a modem or network connection).

Many of the methods are described in their most basic form but steps can be added to or deleted from any of the methods and information can be added or subtracted from any of the described messages without departing from the basic scope of the claimed subject matter. It will be apparent to those skilled in the art that many further modifications and adaptations can be made. The particular embodiments are not provided to limit the invention but to illustrate it. The scope of the claimed subject matter is not to be determined by the specific examples provided above but only by the claims below.

What is claimed is:

1. An apparatus comprising:

a directed audio system having an array of speakers within a ceiling of a physical region;

a network interface communicatively coupled with a network; and a controller to receive, via the network interface, an estimate for a location corresponding to a user from a locating device communicatively associated with the user that is coupled with the network; and the controller coupled with the array of speakers to cause the directed audio system to direct an audio signal by selectively enabling and disabling selected speakers to transmit ultrasonic beams carrying audible content from the array of speakers to provide the audio content to a vertical proximity corresponding to the user and not to other locations within the physical region based on an estimate for the location received from the locating device, wherein one or more of the speakers changes an angle of an ultrasonic beam based on the location of the user, and further wherein the controller manages multiple users by muting or lowering an audio level when two or more users approach each other within a conversational distance.

2. The apparatus of claim 1 wherein the controller is further to cause the directed audio system to direct the audio signal to the location based at least in part on the estimate for the location received from the locating device.

3. The apparatus of claim 2 wherein the network comprises a wireless network.

4. The apparatus of claim 3 wherein the locating device comprises a Global Positioning System (GPS) locating device.

5. The apparatus of claim 4 further comprising a triangulating system communicatively coupled to the network.

6. The system of claim 5 wherein the locating device comprises a locating signal source for the triangulating system.

7. The apparatus of claim 3 further comprising:

a content modifier communicatively coupled to the network to modify the content of the audio signal, the modification based on at least one of the estimate for the location received from the locating device;

a preference indicated by a user;

an identification associated with the user; and an identifier associated with the locating device;

wherein the modification is at least one of selecting the content of the directed audio signal; and altering a sonic characteristic of the directed audio signal.

8. A method comprising:

receiving a location estimate from a locating device at a location corresponding to a user;

automatically directing an audio signal of a directed audio system having an array of speakers in a ceiling of a physical region based on the location estimate by selectively enabling and disabling selected speakers from the array of speakers to provide audio the location corresponding to the user and not to other locations within the physical region, wherein one or more of the speakers changes an angle of an ultrasonic beam based on the location of the user; and managing multiple users by muting or lowering an audio level when two or more users approach each other within a conversational distance.

9. The method of claim 8 further comprising directing the audio signal of the directed audio system to the location based at least in part on the location estimate.

10. The method of claim 9 further comprising receiving the location estimate over a wireless network.

11. The method of claim 10 wherein the locating device comprises a Global Positioning System (GPS) locating device.

12. The method of claim 10 wherein the locating device comprises a locating signal source for the triangulating system and wherein the estimate for the location is computed by a triangulating system communicatively coupled to the network.

13. The method of claim 10 further comprising:

performing one or more of:

selecting the content of the directed audio signal; and altering a sonic characteristic of the directed audio signal depending at least in part on one or more of:

the estimate for the location received from the locating device;

a preference indicated by a user;

an identification associated with the user; and an identifier associated with the locating device.

* * * * *